United States Patent Office 3,429,886
Patented Feb. 25, 1969

3,429,886
**1-TERTIARYAMINOALKYL-3-(4-PYRIDYL)-
INDOLES**
Dieter Beck, Basel, and Karl Schenker, Binningen, Switzerland, assignors to Ciba Corporation, New York, N.Y., a corporation of Delaware
No Drawing. Filed Oct. 12, 1965, Ser. No. 495,326
Claims priority, application Switzerland, Nov. 11, 1964, 14,525/64; Sept. 21, 1965, 13,065/65
U.S. Cl. 260—294.8
Int. Cl. C07d 31/42; A61k 27/00
12 Claims

ABSTRACT OF THE DISCLOSURE

New indoles which contain in position 1 an alkyl radical substituted by an amino group and in position 3 a pyridyl-(4)-group, and their salts. The compounds are useful as anti-inflammatory agents, anti-protozoa agents; they also stimulate the biosynthesis of steroids.

---

The present invention relates to new indoles. Especially it concerns indoles which contain in position 1 an alkyl radical substituted by an amino group and in position 3 a pyridyl-(4) group, and their salts.

The substituted alkyl radical R in the new compounds is more especially a corresponding lower alkyl radical in which the amino group mentioned is separated from the indole nitrogen atom by at least two carbon atoms, such as an ethyl, propyl or isopropyl group substituted by an amino group; or a corresponding linear or branched butyl, pentyl or hexyl group linked in any desired position. A preferred group is the propyl radical.

Amino groups are primarily mono- or disubstituted amino groups, above all tertiary amino groups. Preferred substituents are aliphatic hydrocarbon radicals whose carbon chain may be interrupted by hetero atoms such as oxygen, nitrogen or sulfur atoms and/or may be linked with the alkyl radical and/or may be substituted by hydroxyl groups.

Suitable aliphatic hydrocarbon radicals are those whose first carbon atom, which is linked with the nitrogen atom, is not a member of an aromatic system. These radicals contain with advantage at most 12 carbon atoms, especially 1 to 8 carbon atoms. Particularly suitable are alkyl, alkenyl, alkylene, oxaalkylene, azaalkylene or thialkylene radicals or cycloalkyl, cycloalkyl-alkyl, phenylalkyl such as phenyl-lower alkyl radicals, in which the phenyl group may be substituted, for example by lower alkyl, lower alkoxy groups, halogen atoms or trifluoromethyl groups. As examples there may be mentioned lower alkyl, oxaalkyl, alkenyl, alkylene, oxaalkylene, azaalkylene or thiaalkylene radicals, for example methyl, ethyl, allyl, methallyl, propyl or isopropyl groups; linear or branched butyl, pentyl, hexyl or heptyl radicals linked in any desired position, butylene-(1,4), pentylene-(1,5), hexylene-(1,5), hexylene-(1,6), hexylene-(2,5), heptylene-(1,7), heptylene-(2,7), heptylene-(2,6), 3-oxa- or 3-aza-pentylene-(1,5), 3-oxa- or 3-azahexylene-(1,6), 3-alkyl-3-aza-pentylene-(1,5) such as 3-methyl-3-aza-pentylene-(1,5) radicals, or 3 - (hydroxyalkyl) - 3 - aza - pentylene - (1,5) such as 3-(β-hydroxyethyl)-3-aza-pentylene-(1,5) radicals, or the following radicals which, if desired, may be substituted as indicated above: benzyl, α-phenylethyl, β-phenylethyl or γ-phenylpropyl radicals or cyclopentyl, cyclohexyl, cyclopentenyl or cyclohexenyl radicals, cyclopentyl-, cyclohexyl-, cyclopentenyl-, cyclohexenyl-methyl or -ethyl radicals.

The tertiary amino groups are above all di-lower alkylamino groups such as dimethylamino, diethylamino, methylethylamino or dibutylamino groups, or pyrrolidino, piperidino, morpholino, thiamorpholino or piperazino groups such as N-lower alkylpiperazino or N-(hydroxy-lower alkyl)-piperazino groups, for example the N-methylpiperazino group or the N-(β-hydroxyethyl)-piperazino group.

The new compounds possess a valuable pharmacological, especially an anti-inflammatory, action and are therefore useful as antiphlogistics, for example for the treatment of inflammatory conditions. They further act against protozoa such as plasmodia, and are thus useful for treating malaria. Moreover, they stimulate the biosynthesis of corticosteroids, for example, in the in vitro test in the bovine adrenal cortex homogenate, and can be used in cases of hypofunction of the adrenal cortex. They are also valuable intermediates, for example for the manufacture of pharmacologically active compounds.

Particularly valuable are the compounds of the formula

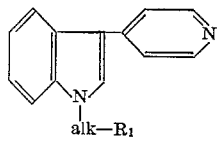

where alk represents a lower alkylene radical, for example the 1,2-ethylene, 1,4-butylene or above all the 1,3-propylene group and $R_1$ represents a di-lower alkylamino group, especially a dimethylamino, diethylamino, dipropylamino or dibutylamino group, an N-lower alkyl-cycloalkylamino group such as the N-cycloheptyl-methylamino group or a pyrrolidino, piperidino, morpholino or N'-methylpiperazino group, and above all the compounds of the formula

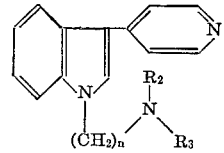

where $R_2$ stands for a methyl or ethyl radical, $R_3$ for a methyl, ethyl, cyclopentyl, cyclohexyl or cycloheptyl radical and $n=2$ or preferably 3. Especially potent are 1-(β-dimethylaminoethyl)-3-(4-pyridyl)-indole, 1-(β-diethylaminoethyl)-3-(4-pyridyl)-indole, 1-[β-(N-methyl-cycloheptylamino)-ethyl]-3-(4-pyridyl)-indole and especially 1-[γ-dimethylaminopropyl]-3-(4-pyridyl)-indole.

The new compounds are obtained in the known manner.

For example, the new compounds are obtained when an indole which is unsubstituted in position 1 and contains in position 3 a pyridyl-(4) radical is reacted with an alkyl halide substituted by an amino group. A halide is above all a chloride or bromide.

The afore-mentioned reaction is performed in the usual manner. The indole is advantageously used in the form of a metal salt, for example an alkali metal salt thereof, such as a sodium or potassium salt, or the reaction is performed in the presence of a condensing agent capable of forming such salts, for example in the presence of an alkali metal hydroxide, amide or hydride, for example sodium hydride.

According to another process for the manufacture of the new compounds an indole that contains in position 3 a pyridyl-(4) radical and in position 1 an alkyl radical which is substituted by a cyano group or a carbamoyl group, is reduced.

The cyano group is reduced in the usual manner, above all with catalytically activated hydrogen, such as hydrogen in the presence of a hydrogenating catalyst such as a palladium, nickel or platinum catalyst.

Carbamyl groups, for example N,N-dimethylcarbamyl groups, can be reduced in the usual manner, for example with lithium aluminum hydride or electrolytically.

Substituents present in resulting compounds can be converted by known manner within the framework of this invention. Thus, for example, substituents, especially lower alkyl groups, can be introduced into resulting compounds containing amino groups comprising at least one hydrogen atom, for example by reductive alkylation, that is to say by reaction with a suitable oxo compound and simultaneous or subsequent reduction. Particularly suitable reducing agents are catalytically activated hydrogen or formic acid.

The afore-mentioned reactions are performed in the usual manner.

Depending on the reaction conditions and starting materials used the final products are obtained in the free form or in the form of their salts which are likewise included in the present invention. The salts of the final products can be converted into the free bases in the known manner, for example with alkalis or ion exchange resins. When the free bases are reacted with organic or inorganic acids, especially those which are capable of forming therapeutically acceptable salts, they yield salts. As such acids there may be mentioned, for example, hydrohalic, sulfuric, phosphoric acids, nitric or perchloric acid; aliphatic, alicyclic, aromatic or heterocyclic carboxylic or sulfonic acids such as formic, acetic, propionic, succinic, glycolic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic acid, embonic, methanesulfonic, ethanesulfonic, hydroxyethanesulfonic, ethylenesulfonic acid; halobenzenesulfonic, toluenesulfonic, naphthalenesulfonic acids or sulfanilic acid; methionine, tryptophan, lysine or arginine.

These or other salts of the new compounds, for example the picrates, may also be used for purifying the resulting free bases by converting the free base into a salt, isolating the latter and liberating the base again from it. In view of the close relationship between the new compounds in the free form and in the form of their salts, what has been said above and below with regard to the free base applies equally to the corresponding salts wherever this is possible and suitable.

The invention includes also any variant of the present process in which an intermediate obtainable at any stage of the process is used as starting material and any remaining step or steps is/are carried out, or in which the starting materials are formed in situ or may be used in the form of their salts.

The reactions of this invention are preferably performed with starting materials that give rise to the aforementioned preferred final products.

The starting materials are known or can be prepared by known methods.

The 1-unsubstituted 3-(4-pyridyl)-indoles use as starting materials are obtained, for example, by dehydrogenating a 3-(N-acyl-1,4-dihydro-4-pyridyl)-indole in the known manner with elimination of the acyl radical. Suitable relevant acyl radicals are, for example, radicals of carboxylic acids or arylsulfonic acids, especially the acetyl radical and above all the benzoyl radical. The dehydrogenation is advantageously carried out by heating in the presence of a dehydrogenating agent, such as atmospheric oxygen or sulfur or above all of palladium carbon. It has been observed that the reaction gives a particularly good yield when it is performed in the presence of a high-boiling amine capable of accepting the acyl radical to be eliminated. Therefore, this preferred process likewise forms an object of this invention. Such high-boiling amines are especially those which boil above 150° C. and contain at least one hydrogen atom, for example secondary amines such as dibenzylamines.

The new compounds may be used, for example, in the form of pharmaceutical preparations containing them in the free form or in the form of their salts, in conjunction or admixture with an organic or inorganic, solid or liquid pharmaceutical excipient suitable for enteral, primarily oral, or parenteral or local administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly, cholesterol or other known medicinal excipients. The pharmaceutical preparations may be, for example, tablets, dragees, capsules, ointments or creams, or in liquid form solutions, suspensions or emulsions. They may be sterilized and/or may contain auxiliaries such as preserving, stabilizing, wetting or emulsifying agents, solution promoters, salts for regulating the osmotic pressure or buffers. They may also contain other therapeutically valuable substances. The pharmaceutical preparations are formulated by known methods. Pharmaceutical preparations for oral application advantageously contain 150–400 mg. especially 250–350 mg., of the active compound per dosage unit.

The new compounds may also be used in the form of animal feeding stuffs or additives to feeding stuffs, using, for example, the usual extenders and diluents or feeding stuffs respectively.

The following examples illustrate the invention.

EXAMPLE 1

5 g. of a 50% suspension of sodium hydride in mineral oil are suspended in 50 ml. of dimethylformamide, and a solution of 19.4 g. of 3-(4-pyridyl)-indole in 60 ml. of dimethylformamide is added dropwise at 35° C. When the evolution of hydrogen has stopped, 12.2 g. of γ-dimethylaminopropyl chloride are added, and the mixture is stirred for 12 hours at 40° C., then poured over ice, acidified with hydrochloric acid and extracted with ether. The aqueous solution is rendered alkaline and three times extracted with ethyl acetate. The dark-colored oil left on evaporation of the ethyl acetate is taken up in acetone, acidified with methanolic hydrochloric acid and ether is added. Recrystallization of the precipitate thus obtained from isopropanol yields 1-(γ-dimethylaminopropyl)-3-(4-pyridyl)-indole dihydrochloride hydrate of the formula

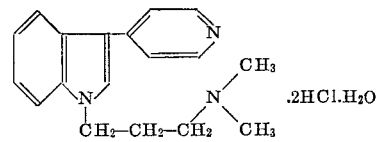

melting at 265° C. with decomposition.

The 3-(4-pyridyl)-indole used as starting material can be prepared thus:

A mixture of 60 g. of 3-(N-benzoyl-1,4-dihydro-4-pyridyl)-indole [prepared according to Dobeneck et al., Chem. Ber. 95, page 1484 (1962)], 40 ml. of dibenzylamine and 3 g. of palladium carbon (of 10% strength) in 350 ml. of diphenyl ether is heated for 5 hours under nitrogen at 210° C., then allowed to cool, suctioned and the residue is washed with ether. The filter cake is repeatedly extracted with 2 N-hydrochloric acid, and the aqueous acid solution is concentrated and rendered alkaline, whereupon 3-(4-pyridyl)-indole melting at 210 and 212° C. precipitates.

EXAMPLE 2

2.5 g. (=0.052 mol) of a 50% suspension of sodium hydride in mineral oil are suspended in 25 ml. of dimethylformamide, and a solution of 9.7 g. (0.05 mol) of 3-(4-pyridyl)-indole in 30 ml. of dimethylformamide is added dropwise at 35° C. When the evolution of hydrogen has ceased, 5.4 g. (0.055 mol) of β-dimethylaminoethyl chloride are added, and the mixture is stirred overnight at 40° C., then poured over ice, acidified with hydrochloric acid and extracted with ether. The aqueous solution is rendered alkaline and three times extracted with ethyl acetate. The liquid base obtained on evaporation of the ethyl acetate is taken up in acetone, acidified with methanolic hydrochloric acid and mixed with ether. Recrystallization of the precipitate thus obtained from methanol+ether yields 1-(β-dimethylaminoethyl)-3-(4-pyridyl)-indole dihydrochloride hydrate of the formula

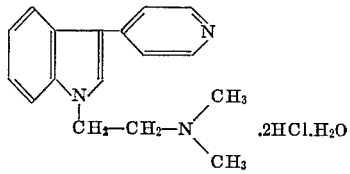

melting at 258 to 260° C. with decomposition.

EXAMPLE 3

2.5 g. (0.052 mol) of a 50% suspension of sodium hydride in mineral oil are suspended in 25 ml. of dimethylformamide, and a solution of 9.7 g. (0.05 mol) of 3-(4-pyridyl)-indole in 30 ml. of dimethylformamide is added dropwise at 35° C. When the evolution of hydrogen has ceased, 6.8 g. (0.055 mol) of β-diethylaminoethyl chloride are added, and the mixture is stirred overnight at 40° C., then poured over ice, acidified with hydrochloric acid and extracted with ether. The aqueous solution is rendered alkaline and extracted three times with ethyl acetate. The liquid base obtained on evaporation of the ethyl acetate is taken up in acetone, acidified with methanolic hydrochloric acid and mixed with ether. Recrystallization of the precipitate obtained from methanol+ether yields 1-(β-diethylaminoethyl)-3-(4-pyridyl)-indole, dihydrochloride hydrate of the formula

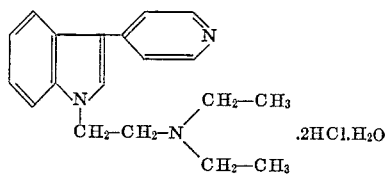

melting at 225° C. with decomposition.

EXAMPLE 4

2.5 g. (0.052 mol) of a 50% suspension of sodium hydride in mineral oil are suspended in 25 ml. of dimethylformamide, and a solution of 9.7 g. (0.05 mol) of 3-(4-pyridyl)-indole in 30 ml. of dimethylformamide is added dropwise at 35° C. When the evolution of hydrogen has ceased, 9.5 g. (0.055 mol) of N-methyl-β-cycloheptylaminoethyl chloride are added, and the mixture is stirred overnight at 40° C., then poured over ice, acidified with hydrochloric acid and extracted with ether. The aqueous solution is rendered alkaline and extracted three times with ethyl acetate. The liquid base obtained after evaporation of the ethyl acetate is taken up in methanol, acidified with the calculated amount of methanolic maleic acid and mixed with ether. Recrystallization of the resulting precipitate from methanol+ether yields 1-[β-(N-methyl-cycloheptylamino)-ethyl]-3-(4-pyridyl)-indole dimaleate of the formula

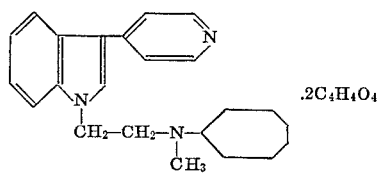

melting at 149° C. with decomposition.

The following compounds are obtained in an analogous manner:

(a) From 7.5 g. of γ-diethylaminopropyl chloride: 1-(γ-diethylaminopropyl)-3-(4-pyridyl)-indole dimaleate hydrate, melting at 114 to 117° C. with decomposition;

(b) From 4.0 g. of β-aminoethyl chloride: 1-(β-aminoethyl)-3-(4-pyridyl)-indole dimaleate, melting at 167° C. with decomposition;

(c) From 6.1 g. of β-(dimethylamino)-α-methylethyl chloride: 1 - [β - (dimethylamino) - α - methylethyl] - 3-(4-pyridyl)-indole dimaleate hydrate, melting at 157° C. under decomposition;

(d) From 7.5 g. of β-cyclopentylaminoethyl chloride: 1 - (β - cyclopentylaminoethyl) - 3 - (4 - pyridyl) - indole dimaleate hydrate, melting at 161° C. with decomposition.

EXAMPLE 5

2.5 g. of a 50% suspension of sodium hydride in mineral oil are suspended in 25 ml. of dimethyl formamide. At 35° C., 9.7 g. of 3-(4-pyridyl)-indole, dissolved in 30 ml. of dimethyl formamide, are added dropwise. When the evolution of hydrogen has ceased, 7.6 g. of β-morpholinoethyl chloride are added, and the mixture stirred overnight at 40° C. It is then poured on ice, acidified with hydrochloric acid, and extracted with ether. The aqueous solution is rendered alkaline, and extracted three times with ethyl acetate. The ethyl acetate is evaporated and the oil which remains behind dissolved in acetone, the solution acidified with methanolic hydrochloric acid, then treated with ether. Recrystallization of the resulting precipitate from alcohol+ether yields 1-(β-morpholinoethyl)-3-(4-pyridyl)-indole-bis-hydrochloride of the formula

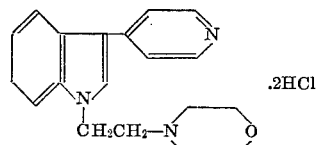

melting at 245° C. (dec.).

EXAMPLE 6

2.5 g. of a 50% suspension of sodium hydride in mineral oil are suspended in 25 ml. of dimethyl formamide. At 35° C., 9.7 g. of 3-(4-pyridyl)-indole, dissolved in 30 ml. of dimethyl formamide are added dropwise. When the evolution of hydrogen has ceased, 8.2 g. of N-(β-chlorethyl)-N'-methylpiperazine are added, and the mixture stirred overnight at 40° C. It is then poured on ice, acidified with hydrochloric acid, and extracted with ether. The aqueous solution is rendered alkaline and extracted three times with ethyl acetate. The ethyl acetate is evaporated and the oil which remains behind dissolved in acetone, the solution acidified with methanolic hydrochloric acid, and treated with ether. Recrystallization of the resulting precipitate from methanol yields 1-[2-(N'-methylpiperazino) - ethyl] - 3 - (4-pyridyl)-indole-tris-hydrochloride-hydrate of the formula

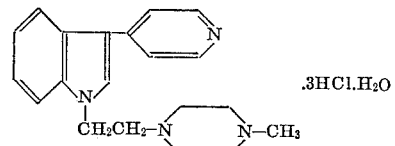

melting at 260° C. (dec.).

EXAMPLE 7

2.5 g. of 50% suspension of sodium hydride in mineral oil are suspended in 25 ml. of dimethyl formamide. At 35° C., 9.7 g. of 3-(4-pyridyl)-indole, dissolved in 30 ml. of dimethyl formamide are added dropwise. When the evolution of hydrogen has ceased, 9 g. of γ-(di-n-propylamino)-propyl-chloride are added, and the mixture stirred overnight at 40° C. It is then poured on ice, acidified with hydrochloric acid, and extracted with ether. The aqueous solution is rendered alkaline, and extracted three times with ethyl acetate. The ethyl acetate is evaporated and the oil which remains behind dissolved in acetone, the solution acidified with methanolic hydrochloric acid, and treated with ether. Recrystallization of the resulting precipitate from acetonitrile+ethyl acetate yields 1-(γ-dipropylaminopropyl) - 3-(4-pyridyl)-indole-bis-hydrochloride of the formula

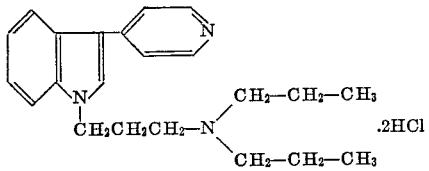

melting at 206–208° C.

EXAMPLE 8

2.5 g. of a 50% suspension of sodium hydride in mineral oil are suspended in 25 ml. of dimethyl formamide. At 35° C., 9.7 g. of 3-(4-pyridyl)-indole, dissolved in 30 ml. of dimethyl formamide, are added dropwise. When the evolution of hydrogen has ceased, 10.5 g. of γ-(di-n-butylaminopropyl)chloride are added, and the mixture stirred overnight at 40° C. It is then poured on ice, acidified with hydrochloric acid, and extracted with ether. The aqueous solution is rendered alkaline and extracted three times with ethyl acetate. The ethyl acetate is evaporated and the oil which remains behind dissolved in acetone, acidified with methanolic hydrochloric acid, and treated with ether. Recrystallization of the resulting precipitate from acetonitrile+ethyl acetate yields 1 - (γ - dibutylaminopropyl)-3-(4-pyridyl)-indole-bis-hydrochloride-hydrate of the formula

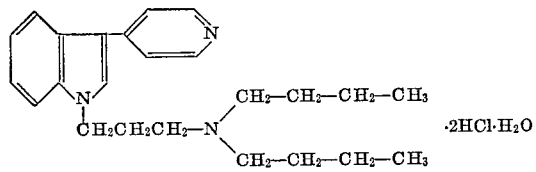

melting at 144–146° C.

EXAMPLE 9

20 g. of 1-(cyanomethyl)-3-(4-pyridyl)-indole are hydrogenated at 80–90° C. under 80 atmospheres (gauge) hydrogen pressure in a mixture of 150 ml. of alcohol and 100 ml. of liquid ammonia using 2.5 g. of Raney nickel as catalyst. The latter is then filtered off with suction and the methanol and the ammonia distilled off. The residual oil is distilled under a high vacuum to yield 1-(β-amino-ethyl)-3-(4-pyridyl)-indole of the formula

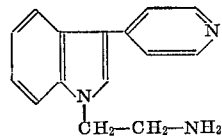

which boils at 204–207° C. under a pressure of 0.4 mm. Hg.

The 1-(cyanomethyl)-3-(4-pyridyl)-indole used as starting material can be obtained as follows:

5 g. of a 50% suspension of sodium hydride in mineral oil are suspended in 50 ml. of dimethyl formamide. At 350 C., 19.4 g. of 3-(4-pyridyl)-indole, dissolved in 60 ml. of dimethyl formamide, are added dropwise. When the evolution of hydrogen has ceased, 7.8 g. of chloroacetonitrile are added, and the mixture stirred overnight at 40–50° C. It is then poured on ice, the resulting precipitate dissolved in ethyl acetate, the solution washed with water, dried over sodium sulfate, and evaporated. The residue is recrystallized from methanol to yield 1-(cyanomethyl)-3-(4-pyridyl)-indole of melting point 190–192° C.

EXAMPLE 10

20 g. of 1-(cyanoethyl)-3-(4-pyridyl)-indole are hydrogenated at 80–90° C. under 80 atmospheres (gauge) hydrogen pressure in a mixture of 150 ml. of alcohol and 100 ml. of liquid ammonia using 2.5 g. of Raney nickel as catalyst. The latter is then filtered off with suction and the methanol and the ammonia distilled off. The residual oil is distilled under a high vacuum to yield 1-(γ-aminopropyl)-3-(4-pyridyl)-indole of the formula

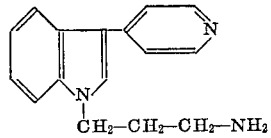

which boils at 209–212° C. under a pressure of 0.4 mm. Hg.

The 1-(cyanoethyl)-3-(4-pyridyl)-indole used as starting material can be prepared as follows:

19.4 g. of 3-(4-pyridyl)-indole are suspended in 200 ml. of benzene and the suspension treated with 6 g. of acrylonitrile. To the boiling mixture, trimethyl-benzylammonium hydroxide in methanol is added until a clear solution is obtained. On cooling, 1-(cyanoethyl)-3-(4-pyridyl)-indole crystallizes out. Melting point, 126–128° C.

EXAMPLE 11

A boiling suspension of 1 g. of lithium aluminum hydride in dioxane is treated dropwise with a solution of 10 g. of 1-[β-(dimethylcarbamyl)-ethyl]-3-(4-pyridyl)-indole in dioxane. The batch is boiled for 2 hours, then treated with water and sodium hydroxide solution. From the alkaline solution, 1-(γ-dimethylaminopropyl)-3-(4-pyridyl)-indole of the formula

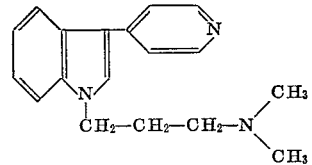

is extracted with ether, which, after evaporation of the ether, distills at 184–186° C. under 0.1 mm. Hg pressure.

The 1-[β-(dimethylcarbamyl)-ethyl]-3(4-pyridyl)-indole can be prepared as follows:

9.7 g. of 3-(4-pyridyl)-indole are suspended in 150 ml. of absolute benzene and the solution treated with 5 ml. of acylic acid methyl ester. Methanolic trimethylbenzylammonium hydroxide solution is added to the boiling solution until it is clear. The solution is boiled for another 2 hours, and the solvent then expelled under reduced pressure.

14 g. of the residual oily 1-(2-carbomethoxyethyl)-3-(4-pyridyl)-indole are heated at 110° C. for 15 hours with 200 ml. of a saturated solution of dimethylamine in methanol. The solution is evaporated, the residue dissolved in benzene, and the solution filtered over alumina. On evaporation of the benzene, 1-[β-(dimethylcarbamyl)-ethyl]-3-(4-pyridyl)-indole of the formula

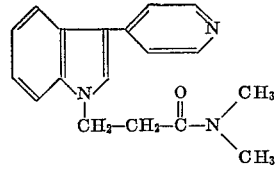

is obtained in the form of a difficultly crystallizing oil.

EXAMPLE 12

5 g. of 1-(β-aminoethyl)-3-(4-pyridyl)-indole are dissolved in 5 ml. of 85% formic acid, the solution treated with 3.5 ml. of formalin, and heated at 100° C. for 8 hours. After the addition of 30 ml. of 2 N-hydrochloric acid the batch is evaporated and the residue recrystallized from ethanol+ether. The resulting 1-(β-dimethylaminoethyl)-3-(4-pyridyl)-indole - dihydrochloride - hydrate of the formula

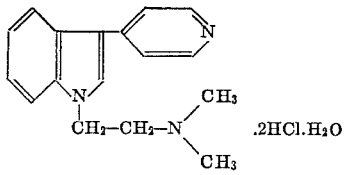

melts at 258–260° C. (with decomposition).

EXAMPLE 13

Tablets, each containing 300 mg. of 1-(γ-dimethylaminopropyl) - 3-(4-pyridyl) - indole - dihydrochloride-hydrate, can be prepared, for example, from the following ingredients:

| | per tablet, mg. |
|---|---|
| 1-(γ-dimethylamino-propyl) - 3-(4-pyridyl)-indole-dihydrochloride-hydrate | 300 |
| Lactose | 35 |
| Wheat starch | 45 |
| Colloidal silicic acid | 22 |
| Arrowroot | 24 |
| Talc | 22 |
| Magnesium stearate | 2 |
| | 450 |

Preparation

The 1-(γ-dimethylamino-propyl)-3-(4-pyridyl)-indole-dihydrochloride-hydrate is mixed with the lactose, part of the wheat starch, and with colloidal silicic acid, and the mixture passed through a sieve. The remaining wheat starch is pasted on the water bath with the five-fold quantity of water, and the powder mixture kneaded with resulting paste until a slightly plastic mass is obtained. The plastic mass is forced through a sieve having a mesh width of about 3 mm., then dried, and the dry granulate also passed through a sieve. The arrowroot, talc and magnesium stearate are then admixed, and the resulting mixture compressed into tablets each weighing 450 mg.

What is claimed is:

1. A member selected from the group consisting of compounds of the formula

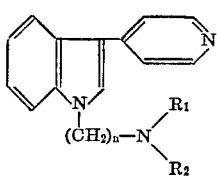

in which $n$ stands for an integer from 2 to 3, $R_1$ for a member selected from the group consisting of methyl and ethyl and $R_2$ for a member selected from the group consisting of methyl, ethyl, cyclopentyl, cyclohexyl and cycloheptyl and acid addition salts thereof.

2. A member selected from the group consisting of a compound of the formula

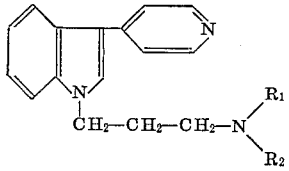

in which $R_1$ and $R_2$ represent lower alkyl and an acid addition salt thereof.

3. A member selected from the group consisting of 1-(γ-dimethylaminopropyl)-3-(4-pyridyl)-indole and an acid addition salt thereof.

4. A member selected from the group consisting of 1-(β-dimethylaminoethyl)-3-(4-pyridyl)-indole and an acid addition salt thereof.

5. A member selected from the group consisting of 1-(β-diethylaminoethyl)-3-(4-pyridyl)-indole and an acid addition salt thereof.

6. 1-(γ-diethylaminopropyl)-3-(4-pyridyl)-indole.

7. 1-(β-aminoethyl)-3-(4-pyridyl)-indole.

8. 1-[β-(dimethylamino)-α-methyl-ethyl]-3-(4-pyridyl)-indole.

9. 1-(γ-dibutylaminopropyl)-3-(4-pyridyl)-indole.

10. 1-(γ-aminopropyl)-3-(4-pyridyl)-indole.

11. A member selected from the group consisting of compounds of the formula

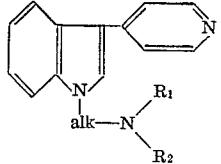

in which alk stands for lower alkylene having up to 6 carbon atoms and $R_1$ and $R_2$ each stands for a member selected from the group consisting of hydrogen, lower alkyl, lower alkenyl, cyclo-lower alkyl, cyclo-lower alkyl-lower alkyl, phenyl-lower alkyl, lower alkyl-phenyl-lower alkyl, lower alkoxy-phenyl-lower alkyl, halogeno-phenyl-lower alkyl, trifluoromethyl-phenyl-lower alkyl and, when taken together with the nitrogen atom for pyrrolidino, piperidino, morpholino, thiomorpholino, piperazino, N-lower alkyl-piperazino or N-hydroxy-lower alkyl-piperazino, each of said lower alkyl, lower alkenyl and lower alkoxy groups having 1 to 8 carbon atoms, and acid addition salts thereof.

12. A member selected from the group consisting of 1-[β - (N-methyl-cycloheptylamino)-ethyl]-3-(4-pyridyl)-indole and an acid addition salt thereof.

References Cited

FOREIGN PATENTS 959,203 Great Britain.

ALEX MAZEL, *Primary Examiner.*

JOSE TOVAR, *Assistant Examiner.*

U.S. Cl. X.R.

167—65; 260—243, 247.1, 247.2, 247.5, 268, 293, 293.4, 294, 296, 999